United States Patent [19]

Oberwelland et al.

[11] 4,063,864
[45] Dec. 20, 1977

[54] APPARATUS FOR THE PRODUCTION OF HOLLOW CONFECTIONS PROVIDED WITH CENTER FILLINGS

[75] Inventors: Hugo Oberwelland; Uwe Klahn, both of Halle, Germany

[73] Assignee: August Storck KG., Halle, Germany

[21] Appl. No.: 713,286

[22] Filed: Aug. 10, 1976

Related U.S. Application Data

[63] Continuation of Ser. No. 552,064, Feb. 24, 1975, abandoned.

[30] Foreign Application Priority Data

July 16, 1974 Germany .............................. 2434024

[51] Int. Cl.² .............................................. A23G 3/12
[52] U.S. Cl. .................................... 425/433; 425/120; 425/134; 425/434; 425/444
[58] Field of Search ............... 425/134, 433, 434, 120, 425/444; 192/70.15, 70.25, 66, 48.3; 403/13, 14, 334, 380

[56] References Cited

U.S. PATENT DOCUMENTS

| | | | |
|---|---|---|---|
| 2,116,740 | 5/1938 | Eason | 192/66 |
| 2,236,854 | 4/1941 | Ocenasek | 64/30 A |
| 3,242,694 | 3/1966 | Schmidt | 64/19 |
| 3,411,813 | 11/1968 | Kreuz | 403/13 |
| 3,443,645 | 5/1969 | Edwards | 64/6 |
| 3,618,340 | 11/1971 | Geisthoff et al. | 64/23 |
| 3,664,153 | 5/1972 | Sugahara | 64/19 |
| 3,666,388 | 5/1972 | Oberwelland et al. | 425/434 |
| 3,764,232 | 10/1973 | Brown | 192/66 |
| 3,791,170 | 2/1974 | Schmidt | 64/19 |
| 3,828,580 | 8/1974 | Armbruster | 64/30 A |

*Primary Examiner*—Francis S. Husar
*Assistant Examiner*—John McQuade
*Attorney, Agent, or Firm*—Browdy and Neimark

[57] ABSTRACT

Apparatus for the production of hollow confections provided with center fillings including conveyor means with centrifugal molds mounted thereon, each mold being fitted with one member of a clutch which moves over a rotary drive comprising the other member of the clutch so that the two clutch members can be brought briefly into engagement for rotating the molds, the two clutch members being displaceable in the conveying direction and being adapted to pull themselves into axial alignment when they engage.

13 Claims, 17 Drawing Figures

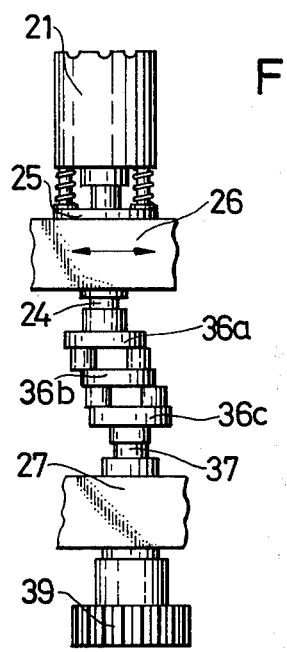
Fig.7
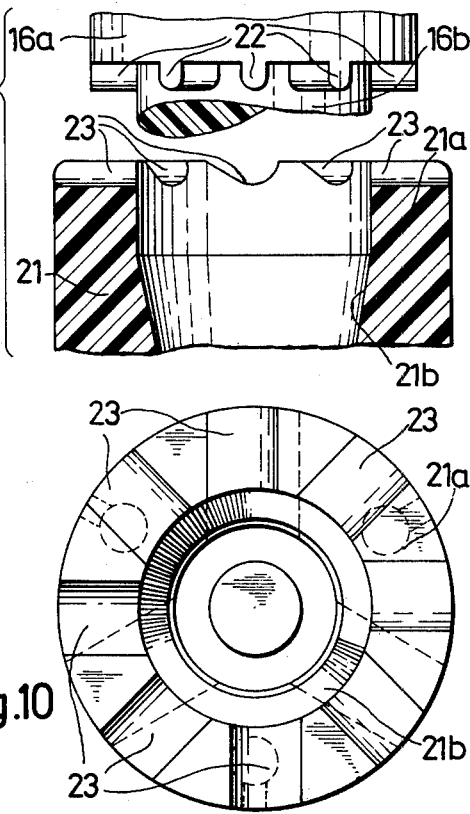
Fig.9
Fig.10
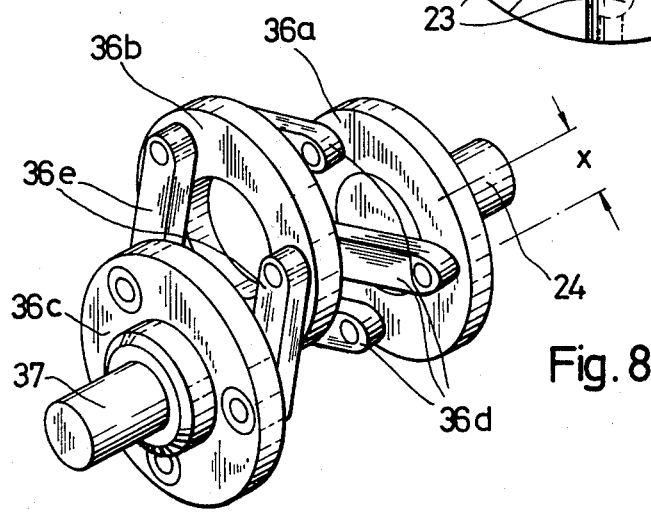
Fig.8

APPARATUS FOR THE PRODUCTION OF HOLLOW CONFECTIONS PROVIDED WITH CENTER FILLINGS

This is a continutation of application Ser. No. 552,064, filed Feb. 24, 1975, now abandoned.

FIELD OF THE INVENTION

The invention relates to apparatus for the production of hollow confections provided with center fillings, as decribed and claimed for instance in German Federal Patent Specification No. 1,955,056 and the corresponding British Patent Specification No. 1,290,359. According to these specifications the confections are produced by centrifugal casting in an open top mold charged with a flowable confectionary mass, the mold being temporarily rotated about a vertical axis by drive means and then cooled and discharged. The centrifugal molds are mounted in transverse and longitudinal rows on conveyor means which carry them underneath a metering feed means for pouring the flowable confectionary mass, rotation being imparted to the molds by a main drive means through clutches controlled by a time switch.

BACKGROUND OF THE INVENTION

In operation, apparatus of such a kind has proved to have certain defects. Due to wear of its components or to stretching of the chain conveyor which carries the molds trouble tends to arise when the cooperating clutch members move into engagement, particularly if the conveyors are of major length and carry a large number of molds. Clutch trouble may result in considerable dislocation in the entire production line.

Furthermore, the upper edge of the spinning confectionery case tends to be of unequal height if rotation of the mold is started during or immediately after the pouring of the confectionary mass into the mold.

SUMMARY OF THE INVENTION

It is an object of the present invention to remedy these remaining defects and to ensure that by precise cooperation of the many parts and assemblies the entire apparatus will work trouble-free, irrespective of any possible wear or fatigue, so that accurately moulded confections will be cleanly discharged from the molds.

According to the invention this is achieved in that the two clutch members associated with the molds and/or with the drive means are displaceable in conveying direction to relation to their associated parts and adapted to pull themselves into axial alignment when they engage. Moreover, the spinning station follows the charging station in the direction of travel of the conveyor at a distance which corresponds to at least one step of the intermittent drive of the conveyor, so that rotation of the molds cannot begin until the confectionery mass which has been poured into the molds has formed a substantially horizontal surface. According to the invention the distance of the spinning station from the charging station is variable and adjustable.

In order to ensure the desired correct cooperation of the two clutch members one of the two clutch members is connected to its associated shaft by a transmission, a Carban shaft, or the like, permitting axial misalignment of the two shafts to be bridged. Conveniently the required compensation of axial misalignment may be achieved by the employment of a conventional double parallel crank coupling. Owing to the displaceability of the clutch members, particularly in the direction of travel of the molds, engagement of the clutch members between the molds and the drive means is always assured, even should the molds that are to be rotated and their clutch members fail to move into precise axial alignment with the corresponding clutch members associated with the drive means or should faults in the pitch of the chain links and wear of the links or chain wheels and so forth after prolonged use cause the relative positioning of the clutch members to change. According to the invention the cooperating clutch members are geometrically suitably designed or provided with projections, recesses and the like to pull the cooperating clutch members automatically into axial alignment when they engage.

With particular advantage several clutch members, particularly several driving clutch members, are mounted on a common clutch holder which is movable for engaging and disengaging the clutches and all the clutch members are geared to a common drive through intermediate gearing. The clutch members are preferably mounted severally or in groups on slides which are slidably displaceable in the common clutch holder in the direction of travel of the centrifugal molds, and the transmission means which permit compensation of axial misalignment may be interposed between the driving clutch members and the intermediate gearing. At the same time the intermediate gearing may also be accommodated in the clutch holder and connected to a fixed driving motor by a Cardan shaft.

The complete clutch holder and all the parts and assemblies mounted therein can be advanced and retracted in clutch engaging and disengaging direction by means of a lifting gear besides being adjustably movable in the direction of travel of the molds in relation to the metering feed means for charging the molds, thereby to enable rotation to be briefly imparted to the centrifugal molds at points which are sufficiently far removed from the metering feed means at the charging station to allow for the consistency of the mass and existing operating conditions.

Preferably the arrangement is such that several centrifugal molds, each together with its associated clutch member attached to its spinning spindle, are freely rotatably mounted on a common transverse holder on the conveyor chain in one or more transverse rows, that the drive means for the molds are located at the spinning station below the conveyor chain, and that a plurality of driving clutch members corresponding in number to the number of molds that are to be simultaneously driven and having a self-aligning action upon engagement with the cooperating clutch members of the molds — each together with a transmission means which compensates axial misalignment — are individually mounted in a common clutch holder in a manner permitting displacement in the direction of travel of the molds and driven by a main drive means through intermediate gearing. In order to permit confections of different shapes to be produced the centrifugal molds in their holders or the transverse holers together with the moulds and associated clutch members are exchangeably mounted so that they can be replaced on the conveyor chain.

The invention can be performed in various ways. A preferred embodiment is shown, purely by way of example, in the accompanying drawings.

BRIEF DESCRIPTION OF THE DRAWINGS

FIGS. 5 and 7 are side elevations and a view from above of part of the drive for the molds, FIG. 8 is a perspective view of a coupling for compensating axial misalignment and FIGS. 9 and 10 are fragmentary views showing the manner of cooperation of the clutch members.

DESCRIPTION OF PREFERRED EMBODIMENTS

Figure 1:
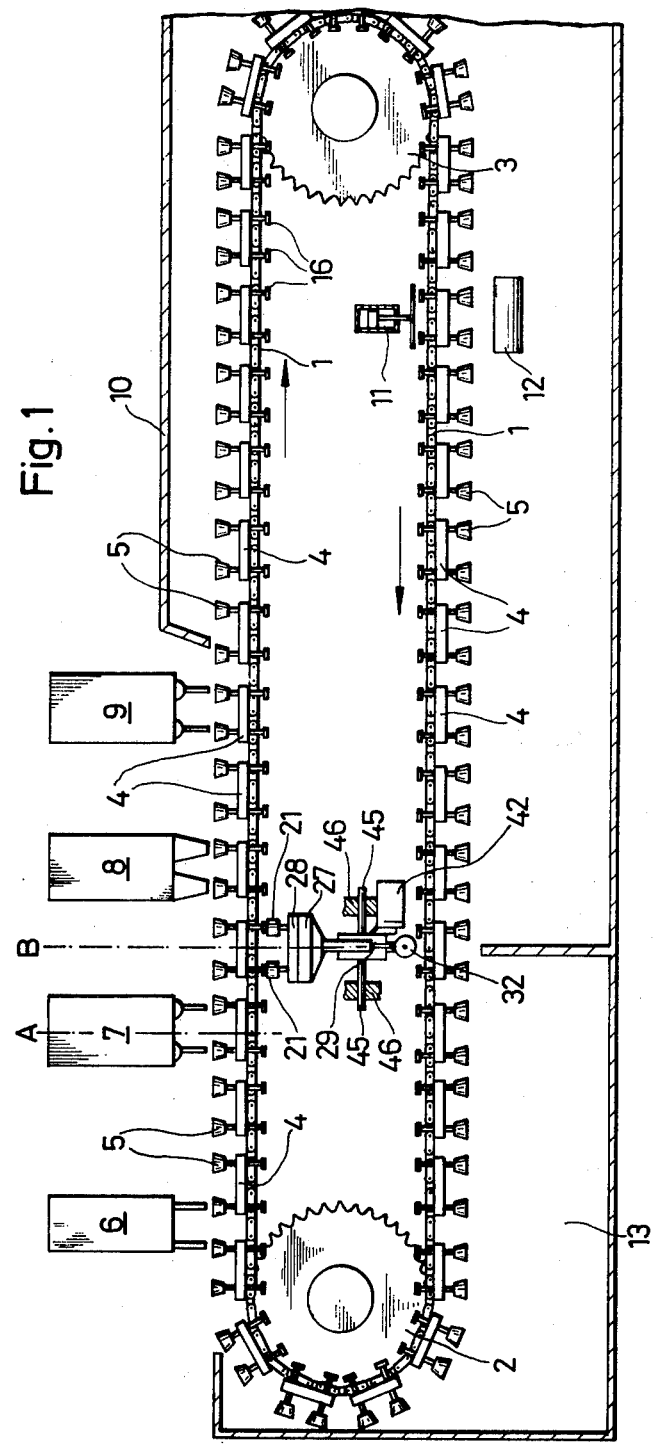
FIG. 1 is a diagrammatic representation of a machine fitted with centrifugal molds for casting hollow confections.
Figure 1A:
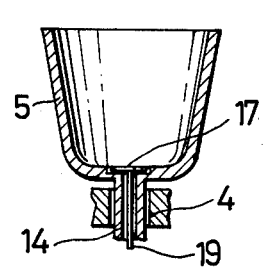
FIG. 1a to 1g are diagrams illustrating consecutive stages of the production process.
Figure 1B:
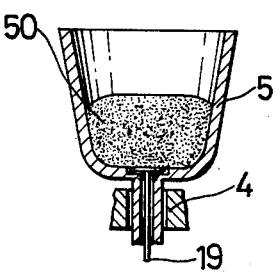
Figure 1C:
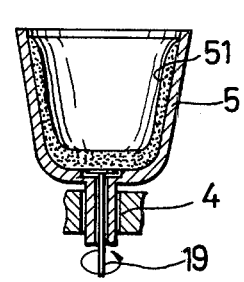
Figure 1D:
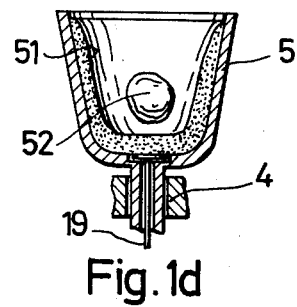
Figure 1E:
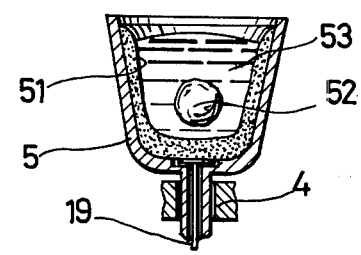
Figure 1F:
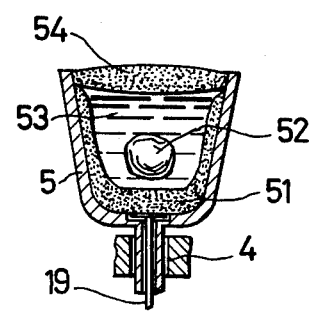
Figure 1G:
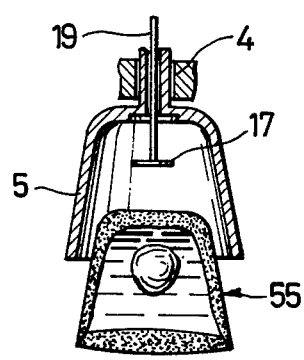
Figure 2:
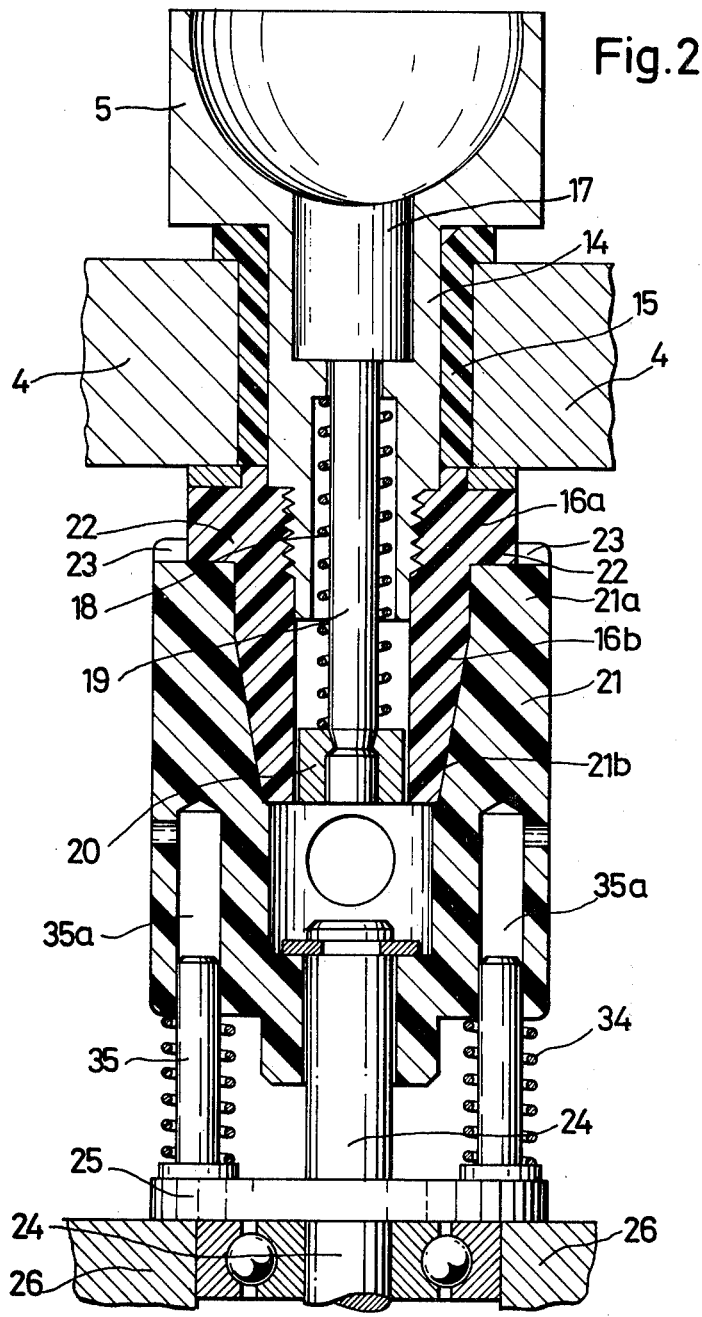
FIG. 2 is an axial section of a centrifugal mold and its associated clutch.

With reference first to FIG. 1 there is provided a casting machine substantially comprising a chain conveyor 1 for molds which travels in intermittent steps in the arrowed direction over return wheels 2 and 3. The chain 1 is exchangeably fitted with holders 4 which carry two rows of rotatable centrifugal molds 5. FIG. 1a represents one such mold 5 empty. As shown in FIG. 1b a flowable confectionery mass 50, such as a hard boiled sugar syrup, chocolate, a croquante mixture or the like, is poured into the molds. Rapid rotation is then imparted to each mold 5 (FIG. 1c) but preferably not until the surface of the mass has found its own level. The speed of rotation and the spinning time depend upon the consistency and composition of the confectionary mass. Centrifugal force causes the mass to rise up the side of the mold and to form a hollow cup 51 which is thus made to set. This can be done by exposing the spinning mass to blast of cold air or by conveying the mold into a cooling zone. As shown in FIG. 1d a nut, raisin, fruit or the like 52 may then be dropped into the open cup 51 at a further working station and, finally, any desired filling 53 which may be a liquid or cream is introduced as indicated in FIG. 1e. When this has been done a capping mass 54 is deposited (FIG. 1f) over the filling and rotation of the mold is resumed to ensure that the capping mass spreads evenly over the open surface and bonds with the edge of the cup. The molds then travel through a cooling chamber and they are turned upside down (FIG. 1g) as they are carried over the return wheel by the returning strand of the chain, permitting the finished confection 55 to be ejected from the mold by a short stroke of an ejector 17 and 19 and carried away elsewhere.

Above the working path of the molds diverse metering feed means are provided (FIG. 1). Preferably before receiving the confectionery mass the molds 5 are wetted with a parting oil issuing from a sprayer head 6. This later facilitates the removal of the finished confection from the mold. In the direction of travel there then follows a metering feeder 7 for the flowable confectionery mass, such as a hard boiled sugar syrup, chocolate, carmel or like mass, and this may be followed by a feeder 8 for introducing into each cup a nut, a raisin, a cherry and/or a mass for forming the chocolate center and by yet another metering feeder 9 for a capping mass. These several units may be spaced at varying distances in the direction of travel to provide sufficient time for the molded cup to set before a nut or liquid center filling and later the capping mass are introduced. Finally the molds are taken through a cooling chamber 10. In this chamber the molds 5 may be emptied by ejector means 11 which deposit the confections on an external delivery conveyor 12. The empty molds then travel through a heating chamber 13 and are finally returned over the return wheel 2 to the upper part of the mold conveying path where they are again charged with confectionery mass.

The flowable confectionery mass is introduced at a so-called charging station marked A in FIG. 1 by the metering feed head 7 into the molds 5 whilst the chain conveyor is stationary. In the following spinning station B the molds 5 are briefly rotated by drive means controlled by a time switch, as will be later described.

To ensure that the case 51 which is to be molded from the mass 50 has a satisfactorily straight horizontal edge which will subsequently bond with the capping mass as desired, rotation of the molds is delayed until the confectionery mass 50 introduced into the still stationary mold 5 has formed a substantially level surface. For this reason the molds 5 are not started up until they reach the spinning station B which follows station A where the mass is introduced at a distance therefrom corresponding to one or more steps of the intermittent drive of the chain.

Figure 3:
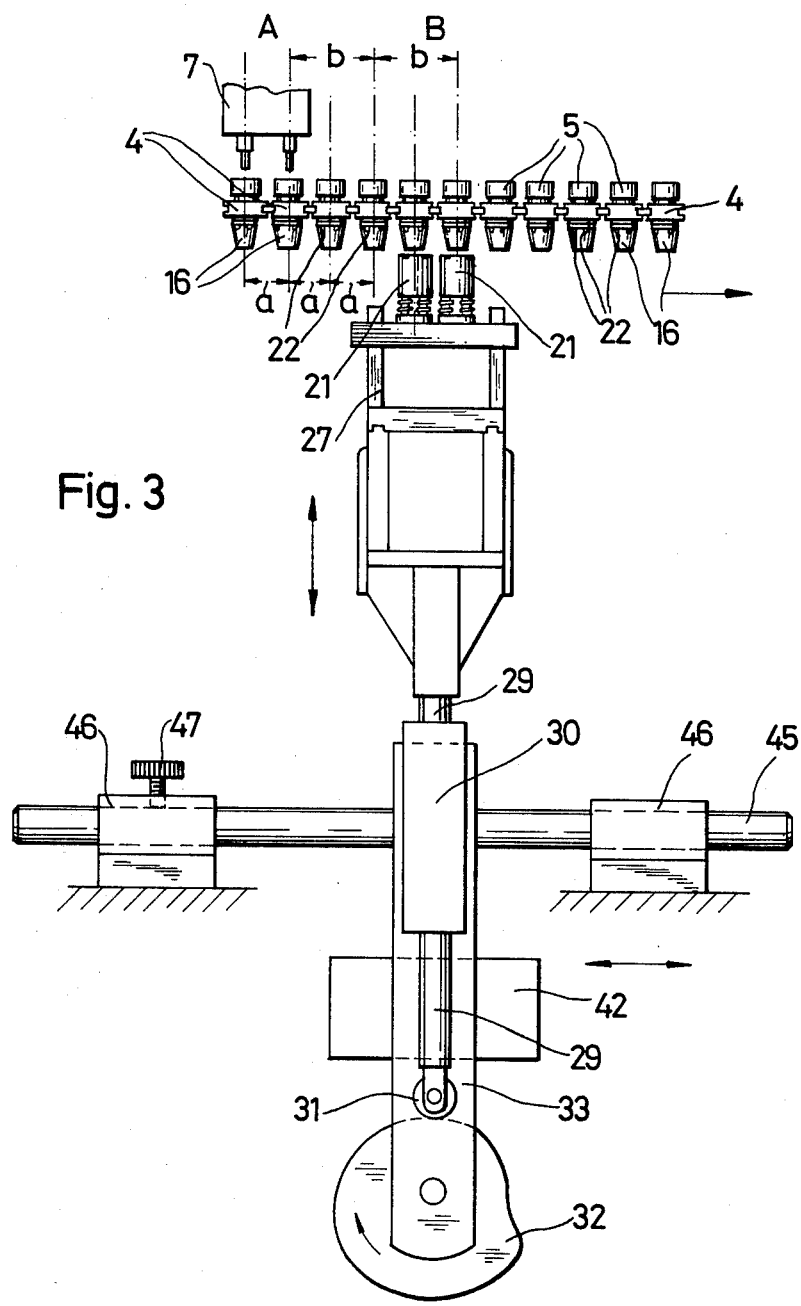
FIG. 3 is an illustration of that part of the machine which includes the charging and spinning stations.

In FIGS. 1 and 3 the spinning station B is shown displaced a short distance in the direction of travel away from the charging station A and in FIG. 3 it will be seen that this distance is several times the center spacing $a$ of consecutive molds.

Since the molds are disposed in two rows which are simultaneously served by the feeders each step of the intermittent drive of the conveyor chain advances the molds a distance $b$ equal to twice their center spacing $a$, so that $b = 2a$. The distance from A to B in the direction of travel may be for instance four times the center spacing $a$ or two conveying steps, so that the time it takes to perform two conveying steps $b$ is available for the mass to form a flat horizontal surface. This time should be controlled according to the nature of the mass that is being molded and in accordance with other operating parameters by bodily displacing the clutch assembly for imparting rotation to the molds in the direction of travel of the molds.

As already described, each holder 4 preferably carries two rows of molds 5. The holders 4 may be exchangeable in the chain as complete units and/or the centrifugal molds 5 themselves may be individually replaced in the holders 4. Each mold 5 is formed with a hollow spindle 14 which is rotatably mounted in a possibly plastics bush 15 in the holder 4. Below each holder 4 the spindle 14 carries a clutch member 16 in the form of a clutch cone 16b provided with a flange 16a. Axially movably contained inside the hollow spindle 14 is an ejector head 17 which is attached to a rod 19 projecting from the end of the journal. Interposed between a collar 20 at the bottom end of the rod 19 and the journal 14 is a compression spring 18 which urges the ejector head 17 into position of rest. At the ejecting station 11 a tappet now shown in the drawing is adapted to jerk the collar towards the spindle end, causing the ejector 17 to dislodge the confection from the mold 5 which is now upside down.

At the mold spinning station the clutch members 16 of the molds 5 cooperate with driving clutch members 21. Each driving clutch member 21 contains a central frusto conical socket 21b which conforms with the frusto-conical portion 16b of clutch member 16 and which in its end face 21a contains radical grooves 23 for the reception when the clutch engages of corresponding ribs 22 projecting from the flange 16a. The shape of the grooves 23 and of the projecting ribs 22 can be clearly seen in FIGS. 9 and 10. The arrangment is such that a driving clutch member 21 containing the grooves 23 can slide across the projecting ribs 22 if for any reason whatsoever the molds 5 should have become jammed in their bearings.

For this reason the clutch members 21 are axially yielding, being kept in engagement with the clutch members 16 by the thrust of compression springs 34.

Conveniently the clutch members 16 and 21 may consist of a plastics, such as a polyamide, "Ultramid" or the like, which can be easily shaped, and which ensures a satisfactory coupling action.

On the other hand the shape of the two clutch members is such that they are self-aligning, i.e. the frusto-conical portion 16b of each clutch member can displace th corresponding frusto-conical socket of respective ones of the clutch members 21 sideways if the two clutch members 16 and 21 are not complete axial alignment.

Figure 5:
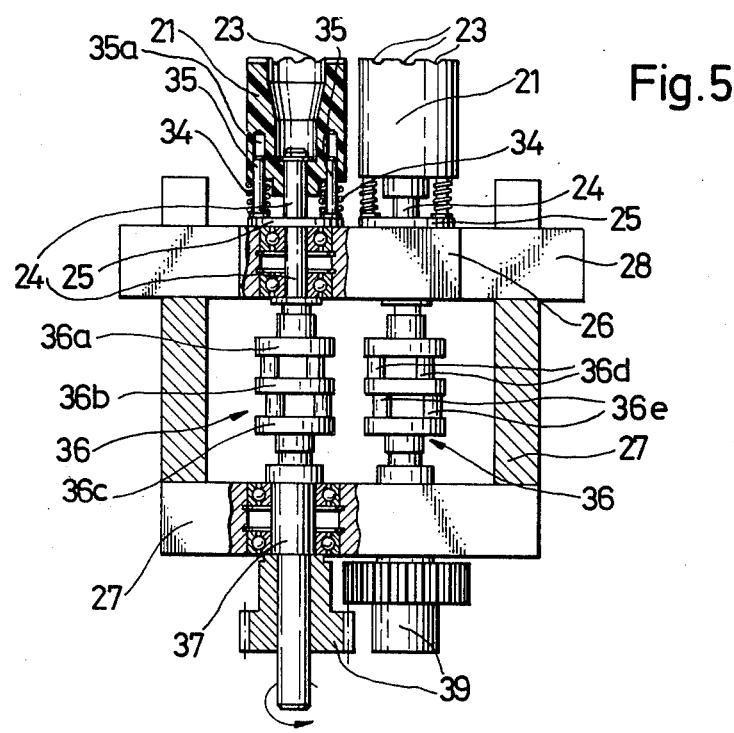
Figure 6:
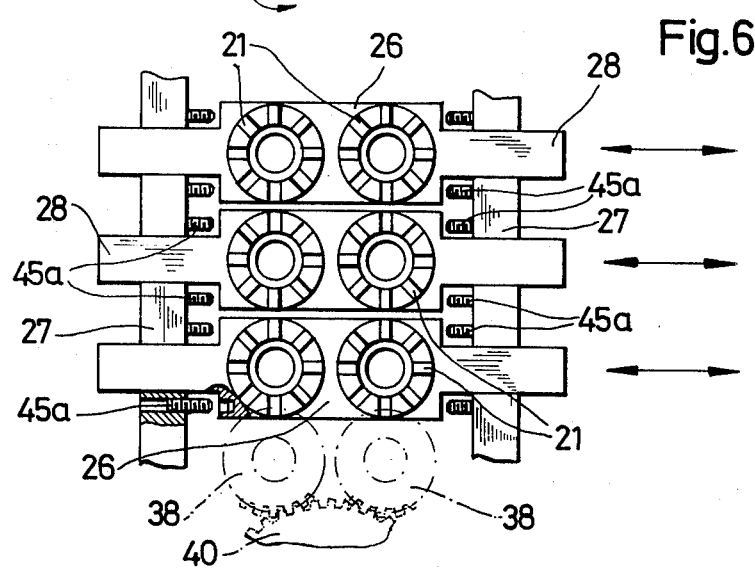

Axial alignment of the two clutch members can thus be established because the clutch members 21 are mounted in slides 26 which are slidably mounted in a common clutch holder 27. In respect of each pair of molds two driving clutch members 21 are mounted on a common slide 26, each slide 26 having extensions 28 which are slidably movable in ways in a common clutch holder 27 in the direction of travel of the molds (FIGS. 5 to 7). The distance of slidable displacement is limited by set screws 45 (FIG. 6) which are adjustably screwed into the inside wall of the clutch holder 27. The clutch holder 27 extends across the width of the conveyor 1, i.e., from each end to end of a row of molds. It is mouted on a rod 29 which is vertically slidably movale in a sleeve 30 (FIG. 3). The bottom end of the rod 29 carries a roller 31 which rides on a cam 32 mounted in a cam holder 33 and driven by an articulated drive shaft not shown in the drawing. When the cam 32 is rotated the entire clutch holder assembly 29, 27 together with the driving clutch members 21 is raised and lowered sufficiently to effect engagement and disengagement of the clutch members in synchronism with the working cycle of the machine.

Each driving clutch member 21 is axially slidable on a driving spindle 24 (FIG. 5) which has a collar 25 and which is itself mounted in the slide 26. The clutch member 21 is driven by pins 35 which slidably engage blind holes 35a in the member 21. Moreover, compression springs 34 embracing the pins 35 are interposed between the collar 25 and the clutch member 21. The springs are responsible for the yielding engagment of the two clutch members.

The bottom end of each driving spindle 24 is connected by a double parallel crank coupling 36, known as a Schmidt coupling (FIG. 8), to the end of a drive shaft 37 mounted in the clutch holder 27. The coupling substantially comprises three rotary members, each having the form of a circular plate, viz. 36a, 36b, 36c. These are interconnected by two sets of three cranks 36d and 36e, pivotably attached to the plates at points located on a concentric pitch circle at equiangular intervals of 120°. The two outer plates 36a and 36c are fast on the ends of the cooperating input respectively output shaft 24 and 37, whereas the floating position of the plate 36b in the center is determined exclusively by the cranks 36d and 36e to which it is attached. Any axial misalignment "x" between input and output shafts 24 and 37 causes the center plate to occupy a defined position in which it rotates about its own axis.

Figure 4:
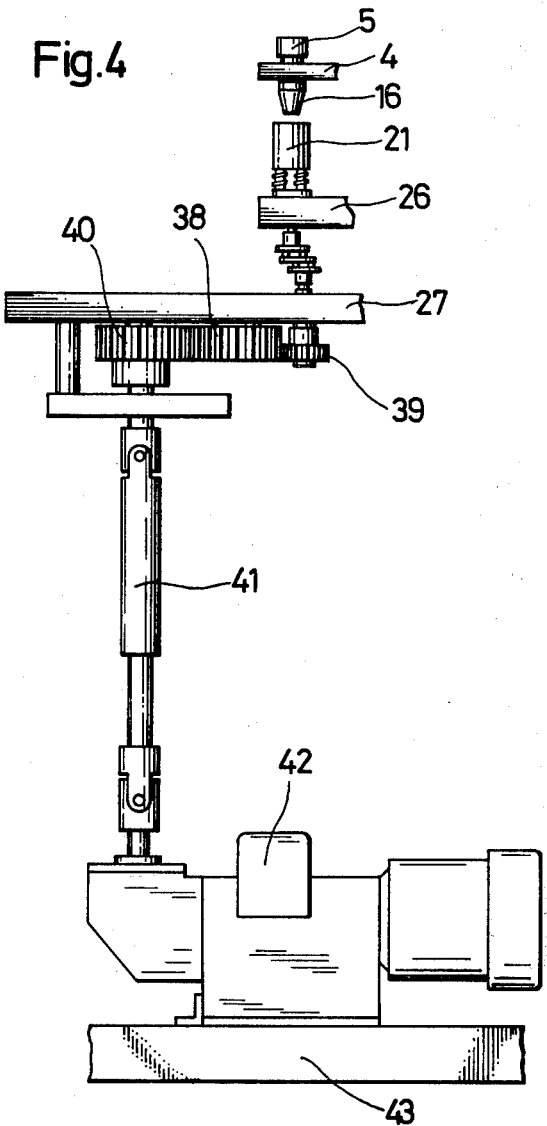
FIG. 4 is a fragmentary view of the clutch drive for spinning the molds.

All the drive shafts 37 which are mounted in a common clutch holder 27 are geared together by pinions 39. On the other hand, the pinions mesh with intermediate gears 38 which engage a principal gear 40 (FIGS. 4 and 6) driven by a motor 42 through universal joint shaft 41. The motor 42 may be a variable speed motor fixed in the machine frame 43. The universal joints at each end of the shaft 41 permit the entire driving clutch head to be moved in any direction. This is necessary firstly to enable vertical motion to bring the clutch members into engagement for driving the molds and secondly to permit compensation of axial misalignment due to positional change of the molds caused by expansion or wear of the chain to be effected by horizontal displacement. A time switch not shown in the drawing synchronises the intermittent conveyor chain drive and the motions of clutch engagement and release according to the requirements of the casting (charging of the molds) and spinning operation. The one motor 42 drives all the clutches 21 continuously at the speed required for spinning e.g. at 800 to 1000 r.p.m., rotation being imparted to the molds only for as long as the clutches are in engagment (fractions of seconds), the speed of the motor being controllably adjustable by reference to the nature and consistency of the confectionery mass that is to be spun. The clutch holder 27 including the lifting mechanism 29 to 33 rests on a slide 45 which is slidably mounted in fixed ways 46 and adjustable by means of a screw 47. The driving motor 42 may participate in such adjustment or the motor may remain stationary, since the Cardan shaft 41 permits any such displacement of the clutch and drive assembly.

We claim:

1. Apparatus for the production of hollow confections provided with fillings, comprising, in combination: a rotary drive, metering feed means, a spinning station, a plurality of cup-shaped centrifugal molds, conveyor means which travel in a conveying direction under said metering feed means for casting a flowable confectionery mass into cup-shaped centrifugal molds which are mounted on said conveyor means for rotation about a vertical axis and each fitted with a first clutch member having a surface defined by at least a portion of a cone and which at said spinning station is moved by said conveyor means over said rotary drive which includes at least one second clutch member mounted on a clutch holder and having a surface defined by at least a portion of a cone, said rotary drive further including a drive means and coupling means connecting said second clutch member to said drive means, means connected to said clutch holder for bringing said first and said second clutch members into and out of engagement for causing said molds to be rotated by said rotary drive, means displaceably mounting at least one of said first and second clutch members to be displaceable in the conveying direction in relation to said conveyor means or said clutch holder, respectively and in relation to the other of said first and second clutch members, said first and second clutch members because of their shapes and said displaceable nature relative to one another being adapted to pull themselves into axial alignment as they engage.

2. Apparatus according to claim 1, including a charging station and intermittent driving means coupled to said conveyor means for driving said conveyor means, and wherein the spinning station follows said charging station, which includes said metering feed means, in the conveying direction of said conveyor means at a distance which is equal to at least one step movement of the intermittent drive means.

3. Apparatus according to claim 2, wherein the distance to the spinning station from the charging station is adjustably variable.

4. Apparatus according to claim 1, including a respective shaft connected to each clutch member, each of said second clutch members being connected to its associated shaft by said coupling means for permitting compensation of axial misalignment of the shafts.

5. Apparatus according to claim 4, wherein said coupling means comprises a conventional double parallel crank coupling is provided to compensate axial misalignment 6. Apparatus according to claim 1, wherein several of said second clutch members are provided and are driving clutch members carried on a common clutch holder which is movable for engaging and disengaging corresponding ones of said first clutch members and that all of said second clutch members are geared to a common drive gear means through intermediate gear means.

7. Apparatus according to claim 6, wherein the driving clutch members are mounted on slides which are slidably displaceable in the common clutch holder in the direction of travel of the centrifugal molds, including meas which permit compensation of axial misalignment being interposed between said driving clutch members and said intermediate gear means.

8. Apparatus according to claim 6, wherein said intermediate gear means are also accommodated in the clutch holder and connected to a fixed driving motor by a Cardan shaft which comprise said rotary drive.

9. Apparatus according to claim 6, wherein said clutch holder can be advanced and retracted in clutch engaging and disengaging direction by said means for bringing said clutch members into and out of engagement which includes a lifting gear, said clutch holder and said means for bringing said clutch members into and out of engagement being adjustably movable in the direction of travel of the molds in relation to the metering feed means.

10. Apparatus according to claim 1 wherein said first and second clutch members are respectively driven and driving clutch members and are shaped to have respective frusto-conical projections and frusto-conical recesses.

11. Apparatus according to claim 1 wherein said first and second clutch members are respective plates which are formed on their facing surfaces with entraining means in the form of embossment and corresponding recesses, said first clutch members being formed with a centering frusto-cone which is received into a conformably shaped frusto-conical socket in said second clutch members.

12. Apparatus according to claim 1, including a respective spindle attached to each one of a plurality of said centrifugal molds, each with an individual one of said first clutch members attached to a respective one of said spindles, said molds being freely rotatably mounted in at least one transverse row on at least one common transverse holder fitted to a conveyor chain forming part of said conveyor means, said rotary dirve being located below the conveyor means, and a plurality of said second clutch members constituting driving clutch members corresponding in number to the number of molds that are to be simultaneously driven and having a self-aligning action on engagement with the first clutch members of the molds because of their shapes and said means for displaceably mounting which compensates axial misalignment, said second clutch members being individually mounted in a common clutch holder in a manner permitting displacement of said second clutch members in the direction of travel of the molds.

13. Apparatus according to claim 12, wherein said at least one holder carrying the centrifugal molds is fitted to a conveyor chain, which is part of said conveyor means, in a manner permitting it to be replaced as a unit together with their molds and its clutch members.

* * * * *